US010520589B2

(12) United States Patent
Liobe et al.

(10) Patent No.: US 10,520,589 B2
(45) Date of Patent: Dec. 31, 2019

(54) MULTIMODE ROIC PIXEL WITH LASER RANGE FINDING (LRF) CAPABILITY (71) Applicants: John Liobe, New York, NY (US); Joshua Lund, Dallas, TX (US)

(72) Inventors: John Liobe, New York, NY (US); Joshua Lund, Dallas, TX (US)

(73) Assignee: Sensors Unlimited, Inc., Princeton, NJ (US)

(*) Notice: Subject to any disclaimer, the term of this patent is extended or adjusted under 35 U.S.C. 154(b) by 253 days.

(21) Appl. No.: 15/785,072

(22) Filed: Oct. 16, 2017

(65) Prior Publication Data
US 2019/0113605 A1 Apr. 18, 2019

(51) Int. Cl.
G01S 7/486 (2006.01)
G01S 17/02 (2006.01)
(Continued)

(52) U.S. Cl.
CPC .......... *G01S 7/4863* (2013.01); *G01S 17/023* (2013.01); *G01S 17/10* (2013.01); *G01S 17/89* (2013.01);
(Continued)

(58) Field of Classification Search
CPC ........ G01S 17/89; G01S 7/4863; G01S 17/10; G01S 17/023; H04N 5/3745; H04N 5/378; H04N 5/374
(Continued)

(56) References Cited

U.S. PATENT DOCUMENTS 2,945,915 A 7/1960 Strip
5,754,280 A * 5/1998 Kato ................. G01S 17/32
356/3.06
(Continued)

FOREIGN PATENT DOCUMENTS

EP 2582131 4/2013
JP 2008047125 2/2008
(Continued)

OTHER PUBLICATIONS

Langof, Lidia, et al., "Advanced multi-function infrared detector with on-chip processing," SemiConductor Devices, P.O. Box 2250, Haifa 31021, Israel; Elbit Systems, Electro-Optics El-Op Ltd. P.O. Box1165, Rehovot 76111, Israel; Israeli Ministry of Defence (IMOD), Israel; Proc. SPIE 8012, Infrared Technology and Applications XXXVII, 80120F (May 21, 2011); doi: 10.1117/12.883248.
(Continued)

*Primary Examiner* — Daniel L Murphy
(74) *Attorney, Agent, or Firm* — Locke Lord LLP; Scott D. Wofsy; Judy R. Naamat (57) ABSTRACT A multimode pixel of a pixel array is provided. The multimode pixel includes a photodetector, an image sensing circuit having a first plurality of transistors, and a laser range finding (LRF) circuit having a second plurality of transistors. At least one transistor of the second plurality of transistors, but not all of the second plurality of transistors, is included in the first plurality of transistors. The LRF circuit being configured to perform LRF operations and the image sensing circuit is configured to perform passive imaging operations. The image sensing circuit and the LRF circuit are configured to perform concurrently.

21 Claims, 8 Drawing Sheets (51) Int. Cl.
*G01S 17/10* (2006.01)
*H04N 5/374* (2011.01)
*H04N 5/378* (2011.01)
*G01S 17/89* (2006.01)
*H04N 5/3745* (2011.01)

(52) U.S. Cl.
CPC ............. *H04N 5/374* (2013.01); *H04N 5/378* (2013.01); *H04N 5/3745* (2013.01)

(58) Field of Classification Search
USPC ..................................................... 356/4.01
See application file for complete search history.

(56) References Cited

U.S. PATENT DOCUMENTS

| | | | |
|---|---|---|---|
| 7,206,251 | B1 | 4/2007 | Yu |
| 8,107,057 | B2 * | 1/2012 | Audier .................. G01S 7/487 |
| | | | 356/3.01 |
| 8,736,684 | B1 | 5/2014 | Johansson et al. |
| 8,922,544 | B2 | 12/2014 | Chaji et al. |
| 9,641,781 | B2 | 5/2017 | Lin et al. |
| 2003/0107658 | A1 | 6/2003 | Huang et al. |
| 2004/0113046 | A1 | 6/2004 | Gorder et al. |
| 2004/0227828 | A1 | 11/2004 | Loose |
| 2007/0236480 | A1 | 10/2007 | Sullivan et al. |
| 2009/0076751 | A1 | 3/2009 | Li et al. |
| 2012/0176357 | A1 | 7/2012 | Katoh et al. |
| 2012/0318963 | A1 | 12/2012 | Van Blerkom |
| 2013/0162602 | A1 | 6/2013 | Nakagawa et al. |
| 2013/0297248 | A1 | 11/2013 | Dawson et al. |
| 2014/0002632 | A1 | 1/2014 | Lin |
| 2014/0306921 | A1 | 10/2014 | Ningrat |
| 2015/0026506 | A1 | 1/2015 | Lee et al. |
| 2015/0268792 | A1 | 9/2015 | Hamaguchi et al. |
| 2016/0057366 | A1 | 2/2016 | Lee et al. |
| 2016/0295148 | A1 | 10/2016 | Lin et al. |
| 2018/0041727 | A1 | 2/2018 | Lund et al. |

FOREIGN PATENT DOCUMENTS

| | | |
|---|---|---|
| JP | 2008060621 | 3/2008 |
| KR | 100697238 | 3/2007 |
| KR | 20120138304 | 12/2012 |
| WO | WO-2004019396 | 8/2003 |
| WO | WO-2009031303 | 12/2010 |

OTHER PUBLICATIONS

Mooney, J.M., et al., "Point target detection in consecutive frame starring infrared imagery with evolving cloud clutter," Optical Engineering, 34(9), (1995). doi:10.1117/12.210757, Sep. 1, 1995.

* cited by examiner

MULTIMODE ROIC PIXEL WITH LASER RANGE FINDING (LRF) CAPABILITY

BACKGROUND OF THE DISCLOSURE

1. Field of the Invention

The present disclosure relates to a focal plane array, and more particularly to a readout integrated circuit pixel that has laser range finding capability.

2. Description of Related Art

There is increased interest in systems that perform passive imaging, pulse detection and pulse-repetition frequency decode, and laser range finding. Systems that require multiple sensors pose challenges for integration into a single optical sensor or focal plane array due to size and complexity considerations.

Multi-functional pixels can be provided in readout integrated circuits (ROICs). The ROIC with multi-functional pixels can be provided in a focal plane array (FPA) that has laser range finding capability (LRF) capability.

LRF refers to ranging, which means determining the distance of objects, and tracking objects (targets) that are illuminated by a laser source in a field-of-view (FOV) defined by an FPA. LRF techniques can determine the distance to a target by measuring the time-of-flight (TOF) of a laser pulse from the laser source to a target and back to the receiver, which in this case, is the FPA. The laser source can be co-located near the FPA. Range and range resolution are the two most significant parameters for any LRF system. In an ideal case, ranges can be measured in kilometers and accuracy can be measured in meters. Both of these parameters depend on the receiver's, e.g., the FPA's, signal-to-noise ratio (SNR) and bandwidth. Traditionally, the circuitry of an individual pixel of the FPA has a bandwidth that is too low for TOF determination purposes. However, increasing the bandwidth of the ROIC circuitry to accommodate TOF determination needs typically requires additional circuit elements per pixel as well as increased power consumption, both of which buck trends decreasing pixel area and power consumption.

The LRF function can be performed using voltage-based ramps having a known slope (V/s). Ramp initiation is synchronized to emission of laser pulses by the laser source. Upon reception of a reflected laser pulse by the FPA, the corresponding voltage ramp value is saved and digitized. Using the known ramp slope, the captured ramp value can be converted to time, and then subsequently converted to distance. Using this method, the voltage-based ramp provides a limited analog voltage range. A longer range can be achieved by decreasing the ramp rate at the sacrifice of range resolution. Moreover, additional pixel circuitry used for implementation of the voltage-based ramp technique can affect performance of different imaging modes and/or increase pixel size.

While conventional methods and systems have generally been considered satisfactory for their intended purpose, there is still a need in the art for an FPA capable of passively imaging simultaneous with sensing returned pulses from an active source of illumination (a laser source) at pixel-pitch spatial resolutions and with lower FPA power consumption. The present disclosure provides a solution for this problem.

SUMMARY OF THE INVENTION

In accordance with an aspect of the disclosure, a multimode laser range finding (LRF) pixel of a pixel array is provided. The multimode LRF pixel includes a photodetector, an image sensing circuit having a first plurality of transistors, and a LRF circuit having a second plurality of transistors. At least one transistor of the second plurality of transistors, but not all of the second plurality of transistors, is included in the first plurality of transistor. The LRF circuit is configured to perform LRF operations and the image sensing circuit is configured to perform passive imaging operations. The image sensing circuit and the LRF circuit are configured to perform concurrently.

In embodiments, the LRF circuit has a bandwidth greater than 200 MHz. In embodiments, the LRF circuit has a bandwidth greater than 500 MHz. Furthermore, in embodiments, the multimode LRF pixel further includes a pulse detection circuit and a bias conductor. The pulse detection circuit is configured to perform asynchronous laser pulse detection (ALPD). When a bias signal having a first bias level is applied to the bias conductor, the multimode LRF pixel operates at a first bandwidth that enables the LRF circuit to perform LRF operations. When a bias signal having a second bias level lower than the first bias level is applied to the bias conductor, the multimode LRF pixel operates at a second bandwidth that does not enable the LRF circuit to perform LRF operations but allows the laser pulse detection circuit to perform the ALPD operations.

In embodiments, the LRF circuit is coupled to at least one comparator for comparing output of the LRF circuit. Every comparator coupled to the LRF circuit is external to the multimode LRF pixel.

Furthermore, in embodiments, the multimode LRF pixel further includes a pulse detection circuit configured to perform asynchronous laser pulse detection (ALPD) operations, a first path connected to the image sensing circuit, a second path connected to the pulse detection circuit, and a third path connected to the LRF circuit. The first path is configured for synchronous readout and the second and third paths are configured for asynchronous readout.

In accordance with other aspects of the disclosure a focal plane array (FPA) is provided that has an array of the multimode LRF pixels.

In embodiments, the FPA further includes an array of active pixels, wherein the array of multimode LRF pixels is a proper subset of the array of active pixels. Furthermore, in embodiments, the pixels of the array of multimode LRF pixels perform LRF operations at at least a predetermined resolution, wherein pixels of the array of active pixels that are not included in the array of multimode LRF pixels a) either do not include the LRF circuit or include the LRF circuit but are incapable of performing LRF operations at at least the predetermined resolution and b) include at least one of an image sensing circuit configured to perform passive imaging operations and a laser pule detection circuit configured to perform ALPD operations.

In embodiments, the pixels of the array of active pixels that are not included in the array of multimode LRF pixels include the LRF circuit. A bias signal is applied to each of the pixels of the array of active pixels, the bias signal having a first or second bias level. The level of the bias signal determines whether the pixel is included in the array of multimode LRF pixels. Pixels of the active array that receive an applied bias signal that has the first bias level are included in the array of multimode LRF pixels. Pixels of the active array that receive an applied bias signal that has the second bias level are not included in the array of multimode LRF pixels.

In addition, in embodiments, the FPA further includes at least one control circuit that receives an input control signal and controls the bias level of the bias signal applied to each of the pixels of the array of active pixels. In embodiments, the control signal is based on user input. Furthermore, in embodiments, the pixels of the array of active pixels are structurally uniform.*.

In accordance with further aspects of the disclosure, an LRF apparatus is disclosed that includes a laser source and an FPA that has an array of the multimode laser range finding (LRF) pixels.

In embodiments, the multimode LRF apparatus has an array of active pixels, wherein the array of multimode LRF pixels is a proper subset of the array of active pixels. The pixels of the array of multimode LRF pixels perform LRF operations at at least a predetermined time resolution, wherein pixels of the array of active pixels that are not included in the array of multimode LRF pixels a) include the LRF circuit but are incapable of performing LRF operations at at least the predetermined time resolution and b) include at least one of an image sensing circuit configured to perform passive imaging operations and a laser pule detection circuit configured to perform ALPD operations. A bias signal is applied to each of the pixels of the array of active pixels, wherein the bias signal has a first or second bias level. The level of the bias signal determines whether the pixel is included in the array of multimode LRF pixels. Pixels of the active array that receive an applied bias signal that has the first bias level are included in the array of multimode LRF pixels. Pixels of the active array that receive an applied bias signal that has the second bias level are not included in the array of multimode LRF pixels.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
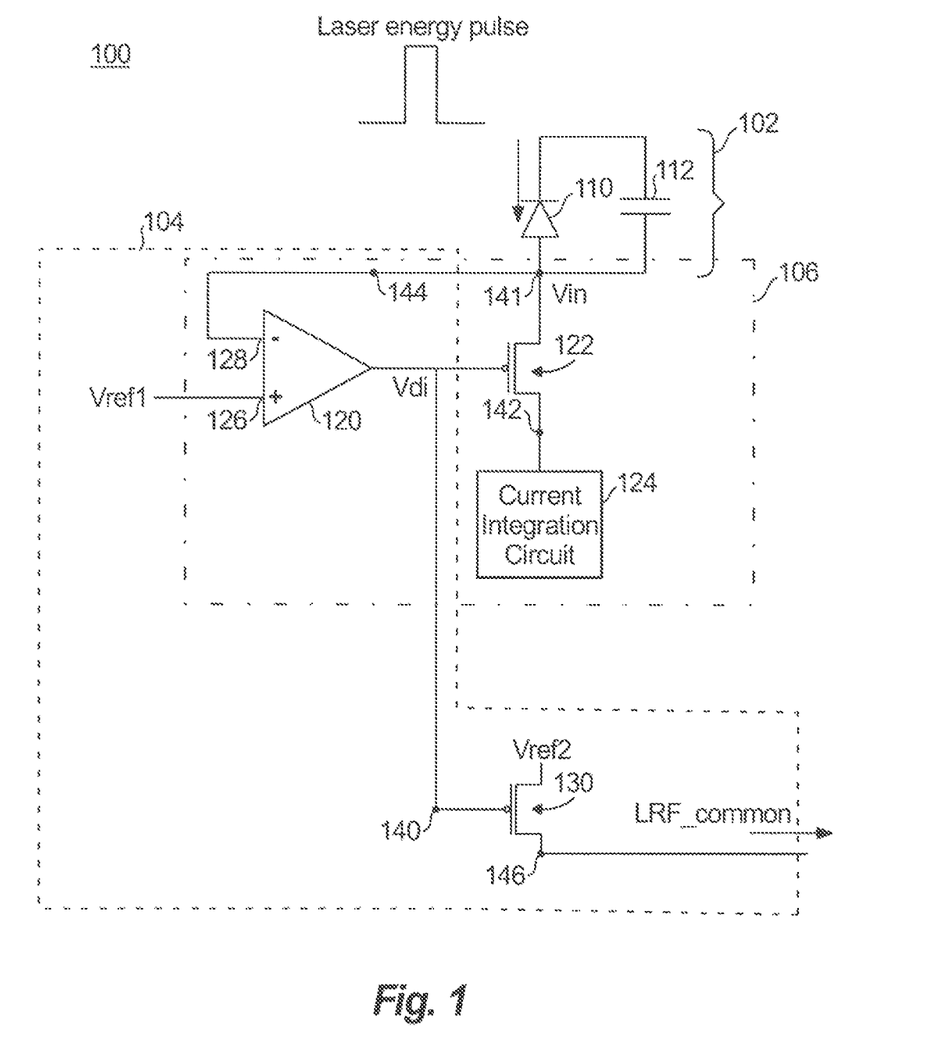
FIGS. 1-3 each show a schematic diagram of exemplary embodiments of a multimode laser range finding (LRF) pixel for multimode sensing of image and/or reflected laser signals in accordance with embodiments of the present disclosure.

Reference will now be made to the drawings wherein like reference numerals identify similar structural features or aspects of the subject disclosure. For purposes of explanation and illustration, and not limitation, a schematic diagram of an exemplary embodiment of an example multimode LRF pixel for multimode sensing in accordance with the disclosure is shown in FIG. 1 and is designated generally by reference character 100. Other embodiments of a multimode LRF pixel in accordance with the disclosure, or aspects thereof, are provided in FIGS. 2-7, as will be described.

As described in greater detail below, the multimode LRF pixel 100 is included in a multimode focal plane (FPA) array that has multimode capabilities for both laser range finding (LRF) and imaging. Each multimode LRF pixel 100 has LRF capabilities, meaning the pixel is able to receive a short duration (nanoseconds to tens of nanoseconds) photocurrent impulse at its input and provide a voltage response at its output within 10 ns of the input pulsed photocurrent event.

One example application of a multimode FPA is a camera used for infrared imaging and laser range finding associated with laser pulses emitted by military laser designators and reflected from targets, such as near infrared (NIR) and short-wavelength infrared (SWIR Other applications for cameras that acquire images and perform range finding for short duration, high frequency light impulses are also envisioned.

LRF techniques can determine the distance to a target by measuring the time-of-flight (TOF) of a laser pulse from a laser source to the target and reflected back to a photodetector. The laser signals emitted by the laser source can have a wavelength visible in the shortwave infrared band. As light travels at a speed of one foot per nanosecond, to achieve a TOF resolution of one foot requires a time resolution of 2 nanoseconds, considering the round trip path. An LRF circuit needs high temporal resolution to detect and timestamp the reflected laser pulses with useful TOF resolution. On the contrary, passive imaging performed by the SWIR camera is a slower process. Output of the photodetector is integrated over time to achieve a desired signal to noise ratio, which sets a practical rate at which image signals are desired to be readout. Accordingly, temporal resolution for imaging can be lower than the temporal resolution needed for laser pulse TOF determination.

Accordingly, the multimode LRF pixel 100 can be included in a pixel array of a camera that is used for acquiring images and detecting laser designation signals for performing LRF operations. The camera can be, for example, a SWIR camera that can be used to detect and timestamp the time of arrival of reflected laser signals, which are commonly of a wavelength visible in the shortwave infrared band. Alternatively, the multimode LRF pixel 100 can also be used to detect and timestamp reflected laser pulses of a non-SWIR wavelength or emitted by other emitters of high frequency pulse energy with short pulse durations. The multimode LRF pixel 100 can be used in a sensor array that detects ultraviolet, visible, or other received electromagnetic signals, such as x-rays.

In the embodiment shown in FIG. 1, the multimode LRF pixel 100 includes a photodetector circuit 102. The photodetector circuit 102 can include a photodetector 110 that has associated built-in depletion capacitance, shown as parasitic capacitor 112. Capacitor 112 can also represent capacitance associated with an electrode connecting an anode of the photodetector 110 to node 141, wherein the term "node" refers to an electrical node. The term "electrical node" or "node" refers to any point on a circuit where two or more circuit elements meet, which can include interconnects (e.g., wire, traces) connected directly to this point before meeting another circuit element.

The photodetector 110 is an IR-sensitive sensing device that outputs photocurrent in response to excitation by photons in IR wavelengths. The infrared-sensitive materials can include, for example, indium antimonide (InSb, pronounced "Inns-Bee"), indium gallium arsenide (InGaAs, pronounced "Inn-Gas"). Alternatively, photodetector circuit 102 could represent any type of detector that generates current in response to a form of input signal that has sufficient bandwidth to convert an input signal to a current for input signal pulses between 1 ns and 1000 ns in duration. The photodetector circuit 102 senses incident light, which in the current example includes ambient infrared light and reflected laser pulses. In response to sensing infrared light, the photodetector circuit 102 can output low frequency signals, whereas in response to sensing reflected laser pulses, the photodetector circuit 102 can output short durations of high frequency signals.

The output from the photodetector circuit 102 is received and processed by an LRF circuit 104 and an image sensing circuit 106. The imaging circuit 106, having a first plurality of transistors, is configured to perform passive imaging operations. The first plurality of transistors includes, for example, transistors included in input buffer 120, control device 122, and transistors included in a current integration circuit 124, wherein the input buffer 120 and control device 122 can form a feedback circuit. The current integration circuit 124 may be any circuit that integrates signal charge to generate an output voltage level. In its most basic implementation, the current integration circuit 124 can be a capacitor. Another example embodiment of the current integration circuit 124 can include a capacitor and a current mirror. Output from the current integration circuit 124 can be directed a switching circuit, which controls providing the output of the integration circuit 124 to a synchronous readout circuit.

The LRF circuit 104, having a second plurality of transistors, is configured to perform LRF operations for detecting asynchronous reflected laser pulses. In order to detect the reflected laser pulses which are operating at high temporal frequencies, the bandwidth of the input buffer 120 must be increased which is realized by increasing the bias current of the input buffer 120. The bias current of the input buffer 120 is increased by utilizing a higher bias voltage. The second plurality of transistors includes, for example, transistors included in input buffer 120 and an amplifying transistor 130.

The amplifying transistor 130 is a minimum-sized (or near minimum-sized) transistor that can provide the output of the multimode LRF pixel 100 to an input/output terminal of a voltage-mode sense amplifier (SA) with output for the LRF circuit 104. Amplifying transistor 130 can be a PMOS or NMOS transistor. Example circuits for processing output from the amplifying transistors 130 of an array of LRF pixels are described in copending U.S. Patent Application entitled PIXEL OUTPUT PROCESSING CIRCUIT WITH LASER RANGE FINDING (LRF) CAPABILITY, filed concurrently with this patent application and which is incorporated herein in its entirety.

A second voltage reference Vref2 is applied to a first terminal of the source/drain terminals of the amplifying transistor 130, and an output signal LRF_common of the multimode LRF pixel 100 is provided as an output via the other terminal of the source/drain terminals of the amplifying transistor 130. Configuration of which of the source/drain terminals is used for application of Vref2 and output of LRF_common depends on configuration of the amplifying transistor 130, such as whether the amplifying transistor 130 is configured as a PMOS or NMOS transistor. In embodiments, one or more sense amplifiers can receive the output of LRF circuits 104 included in an array of the FPA, such as a subarray that includes a proper subset of pixels included in the FPA.

VDI_RiCj represents a voltage internal to an LRF pixel that experiences a voltage delta in response to a short duration photocurrent impulse at the pixel input. VREF2 represents a biasing voltage supply applied to the source of amplifying transistor 106. The difference between the steady state VDI_RiCj voltages and VREF2 affects the amplifying characteristics of the amplifying transistors as well as the response time from a delta on VDI_RiCj to a pulse flag indication at output terminal 122. Accordingly, the LRF circuit 104 and the image sensing circuit 106 share one or more transistors, such as transistors included in input buffer 120. In other words, at least one transistor of the second plurality of transistors, but not all of the second plurality of transistors, is included in the first plurality of transistors.

Additionally, the LRF circuit 104 and the image sensing circuit 106 are configured to perform their respective functions concurrently, meaning the LRF operations and the passive imaging operation can be performed at the same time.

In particular, during operation of the multimode circuit 100, high frequency signals follow a high frequency path and gravitate to node 140 and low frequency signals follow a low frequency path and gravitate to node 142. The high frequency signals are transmitted via node 146 by amplifying transistor 130 as an LRF output signal, LRF_common, that can be processed for determining a time-of-flight between an emitted pulse signal and a sensed reflected signal. The low frequency signals are received by the current integration circuit 124 to generate image signals that can be processed for readout and display.

An example pixel having a high frequency path and a low frequency path is described in U.S. patent application Ser. No. 14/997,171 having U.S. Publication No. 2017/0207262, which is incorporated herein by reference in its entirety. The present disclosure is not limited to a particular configuration of formation of the high frequency and low frequency path.

By way of example, the input buffer 120, which is shown in the example embodiment as an operational amplifier, receives the charge signal output by the photodetector circuit 102 at its input terminal 128. A reference voltage Vref1 is provided to a reference (positive) terminal 126 of the input buffer 120. The input buffer 120 isolates the photodetector circuit 102 from a load of the LRF circuit 104 and further amplifies the signal from the photodetector circuit 102. Initially, the impedance of the control device 122 is high enough that almost all signal charges drift to the input terminal 128 of the input buffer 120 since the input impedance at input terminal 128 is lower than that in control device 122. These accumulated signals at the input buffer 120 tend to exit the input buffer 120 along the high frequency path towards node 140. The signals that flow into the control device 122 are indicated as Vin. Low frequency signals will be passed through control device 122 as the bandwidth of the feedback circuit is sufficient to adjust the impedance of the control device 122 in response to low frequency signal changes.

In effect, this allows high frequency signals, indicated as Vdi to immediately follow the high frequency path to node 140, while the low frequency signals are diverted through the control device 122. As a result, high frequency signals that correspond to high frequency laser pulses that have short durations on the order of nanoseconds (e.g., 1-10 nsec/pulse) and tens of nanoseconds will quickly propagate to the node 140.

As time elapses, all charge signals from the photodetector circuit 102, including low frequency and high frequency signals, can pass through the control device 122 via a charge signal path that traverses node 144, entering the control device's 122 source node and exiting its drain node to the a low frequency path to node 142 for processing by the current integration circuit 124. This allows the low frequency imaging signals that are captured at a slower rate (e.g., 30 msec per frame) to exit the control device 122 and enter the current integration circuit 124. The input buffer 120 is an intrinsic low-pass filter. Input buffer 120 can be an amplifier that includes NMOS or PMOS transistors and has an output RC, wherein R is defined by output resistance of the input buffer 120, and C is defined by the summation of either physical or parasitic capacitances at the output node of input buffer 120.

The output of the input buffer 120 that propagates towards the gate of the control device 122 trends over time to include lower frequency signals that bias the control device 122 to pass primarily low frequency signals from the charge that enters the control device 122 from the output of the photodetector circuit 102, leaving high frequency signals from the charge to accumulate at the input terminal 128 of the input buffer 120. High frequency signal current is blocked by impedance of the control device 122 and integrates at input of the photodetector 110 to become a voltage delta at the input terminal 128 of the input buffer 120, which results in the presence of an amplified high frequency signal at the output of the input buffer 120. The integrated charge from the high frequency signal is conserved and will eventually pass through the control device 122 through the low frequency path that traverses node 142, but by then it has already been low-pass filtered and its high frequency content is lost.

The control device 122 can include a direct injection transistor that receives the charge signal from the photodetector circuit 102. In the example embodiment shown, the direct injection transistor is a p-type MOSFET otherwise referred to as a PMOS transistor. The control device 122 receives the charge from the photodetector circuit 102 at its source node. The charge can only flow through the control device 122 and exit from its gate node to the low frequency signal path when the control device 122 is biased sufficiently by the output of input buffer 120 propagating toward the gate of the control device 122.

At the beginning of signal incidence, the control device 122 is kept at high input impedance, allowing time for high frequency signals to appear at the high frequency path towards node 140. After the high frequency signals appear at the high frequency path, control device 122 is accordingly biased sufficiently from the varying signal at the high frequency path, allowing incident signals to exit to the low frequency signal path as time elapses.

In the embodiment shown in FIG. 1, the LRF circuit 104 is disposed at node 140. In embodiments, the LRF circuit 104 can be disposed at another node, such as node 144 through which a larger quantity of signals traverse. However, the components of the LRF circuit 104 can detrimentally affect performance of current integration circuit 124. Additionally, the high frequency signals traversing node 144 are of relatively low magnitude and more difficult to discern relative to the high frequency signals that traverse node 140.

Positioning the LRF circuit at node 140, rather than node 144 has advantages, since node 140 receives the high frequency signals that propagate through the high frequency path without disrupting operation of the current integration circuit 124. Additionally, the signals traversing node 140 have been amplified by open loop gain of the input buffer 120, which is advantageous for detection of reflected laser pulses.

Figure 2:
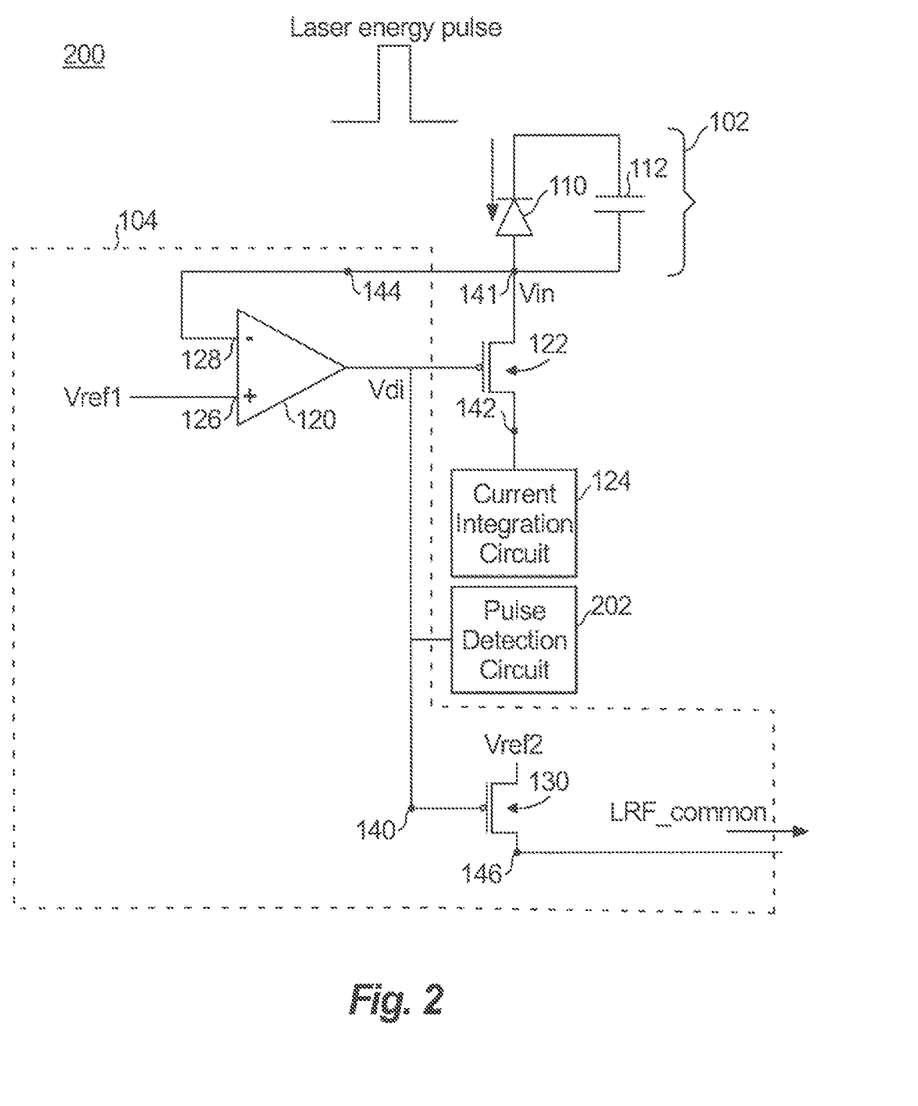

With reference to FIG. 2, a schematic diagram of an embodiment of an example multimode LRF pixel 200 is shown. Description of components of multimode LRF pixel 200 that are the same as multimode LRF pixel 100 shown in FIG. 1, as indicated by their reference numbers, are not repeated, other than for particular relevance to the embodiment shown in FIG. 2. Multimode LRF pixel 200 further includes a pulse detection circuit 202. The pulse detection circuit 202 can include, for example, a filter and a buffer. The filter can further include an amplification device to amplify output from the buffer to provide a signal that is conducive to being readout by a readout circuit controlled by a periodic frame timing signal.

Figure 3:
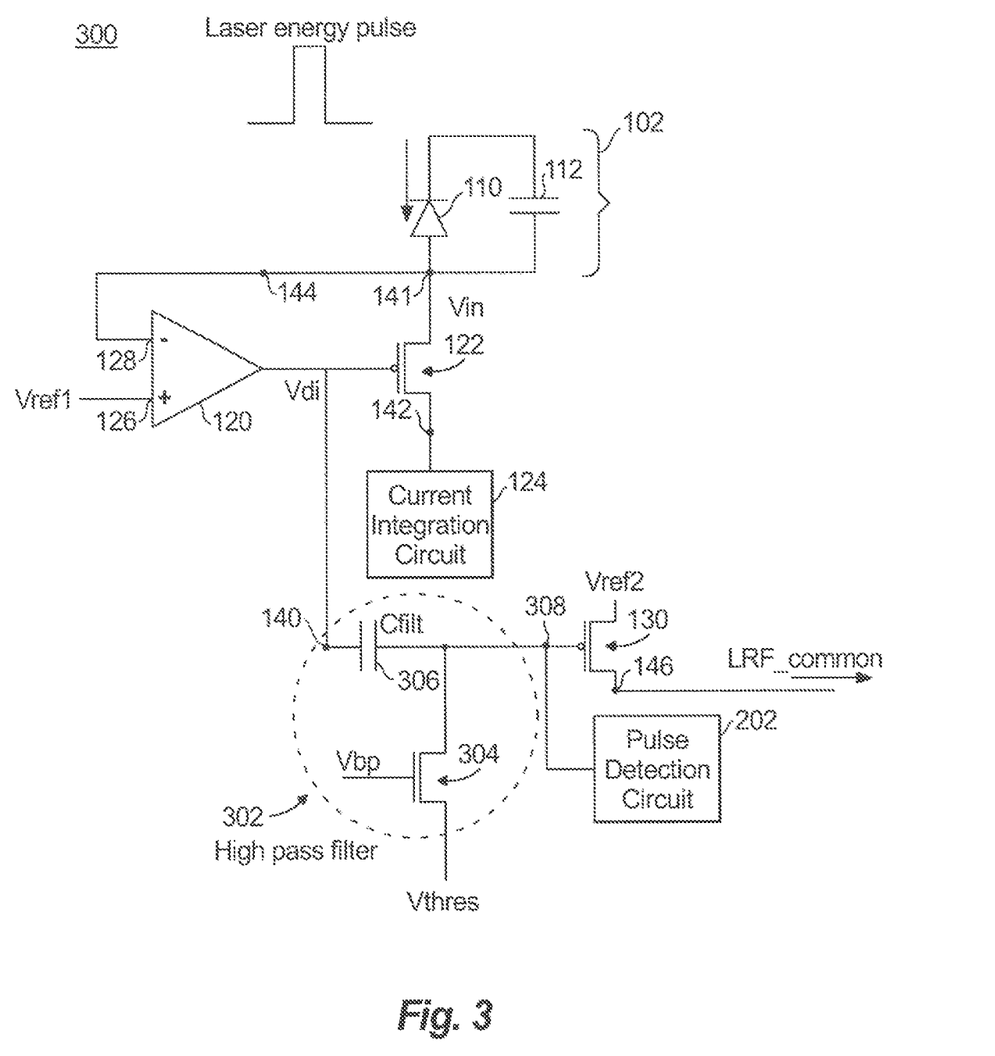

The filter can be high-pass filter or a bandpass filter that is tuned to pass high frequency components and attenuate noise with lower frequency content from this signal, thus increasing the signal-to-noise ratio and the sensitivity of the pulse detection circuit 202 to high frequency inputs to the multimode LRF pixel 300. Since the input buffer 120 functions as an intrinsic low-pass filter, when the filter of the pulse detection circuit 202 is embodied as a high-pass filter, the combination of the input buffer 120 and the pulse detection circuit 202 filter form a bandpass filter. The pulse detection circuit filter can be, for example, an RC filter having a capacitor (not shown) and a resistor (not shown). The output of the pulse detection circuit's buffer (or amplification device, if included) can be controlled by a switch circuit for controlled provision to a synchronous readout circuit. The amplification device can be, for example, an operational amplifier formed of transistors.

In embodiments, the LRF circuit 104 can operate concurrently with both the imaging circuit 102 and the pulse detection circuit 202 or with either one of the imaging circuit 102 and the pulse detection circuit 202.

In embodiments, the image sensing circuit 106 and the pulse detection circuit 202 can share one or more electrical devices (e.g., an amplifier, buffer, transistor, resistor, and/or capacitor). In other embodiments, the image sensing circuit 106 and pulse detection circuit 202 are independent of one another and do not share any electrical devices.

Accordingly, the multimode LRF pixel 200 includes three different paths exiting from the pixel, namely a first path tapped at node 142 for passive imaging, current integration and imaging frame-synchronized readout, a second path tapped at node 140 for pulse detection with a pulse frame-synchronized readout, and a third path tapped at node 140 (or node 308 as shown in FIG. 3) for asynchronous transmission and LRF processing.

The first and second paths are both synchronous relative to their respective image and pulse frame timing signals, wherein the image and pulse frame timing signals may be asynchronous relative to each other. While the pulse detection circuit 202 performs ALPD, this refers to detection of laser pulses that are asynchronous relative to the pulse frame timing signals. The readout from the pulse detection circuit 202, however, is synchronized with the pulse frame timing signals.

The third path provides both asynchronous LRF processing and transmission, and does not use a frame timing signal for readout. Activity along the third path is initiated by detection of a pulse event in the pixel. Once a pulse event is detected, there is no timing signal to initiate data readout activity. Rather, an asynchronous LRF_common signal that indicates when a pulse event has been detected is transmitted from the pixel.

Outside of the pixel, the LRF_common signal is processed in an asynchronous manner, without use of a timing signal, by a first portion of a TOF receiver circuit. The first portion of the TOF receiver circuit can, for example, compare the LRF_common to a threshold signal or combine, e.g., at a common net, the LRF_common signal output by the pixel with LRF_common signals output by other pixels of the pixel array, such as for comparison to a threshold signal and/or applying an OR function (e.g., using one or more comparators, OR circuits (or the equivalent), sense amplifier(s) or the like. Thus, the first portion of the TOF receiver circuit can verify detection of a pulse event by any of the pixels in the array.

In a second portion of the TOF receiver circuit, the time at which detection of the pulse event by the first portion can be recorded, e.g., by a counter latch, and compared to a reference time to determine the relative time difference between original emission of a laser pulse by the laser source and verified detection of the reflected laser pulse.

With reference to FIG. 3, a schematic diagram of an embodiment of an example multimode LRF pixel 300 is shown. Description of components of multimode LRF pixel 300 that are the same as multimode LRF pixels 100 and 200 shown in FIGS. 1 and 2, as indicated by their reference numbers, are not repeated, other than for particular relevance to the embodiment shown in FIG. 3. Multimode LRF pixel 300 further includes a high pass filter 302 disposed in the high frequency path to node 240. The high pass filter 302 can include, for example, a transistor 304 and a capacitor 306. The amplifying transistor 130 of the LRF circuit 104 is connected to node 308, since signals passing through node 308 are filtered by the high pass filter 302.

A frequency response of the high pass filter 302 is controlled by a first bias Vbp applied to the gate of the transistor 304 and Vthres applied to a source or drain terminal of the transistor 304. In the example shown, the transistor 304 is an NMOS transistor and Vthres is applied to its drain terminal. In embodiments, the transistor 304 is a PMOS transistor, and Vthres is applied to its source terminal. Vthres is additionally used to control a bias of the amplifying transistor 130 to very near its threshold. As shown in the example of FIG. 3, the amplifying transistor 130 is a PMOS transistor, however, in embodiments, the amplifying transistor 130 can be a NMOS transistor.

Node 140, upstream relative to the high pass filter 302, is susceptible to spurious, low frequency signal content, which can mask a reflected high frequency laser signal and impede its detection. By connecting the amplifying transistor 130 to node 308, the benefits of connecting to node 140 rather than node 144 are reaped, with the additional benefit of removal of spurious, low-frequency signal content.

Figure 4:
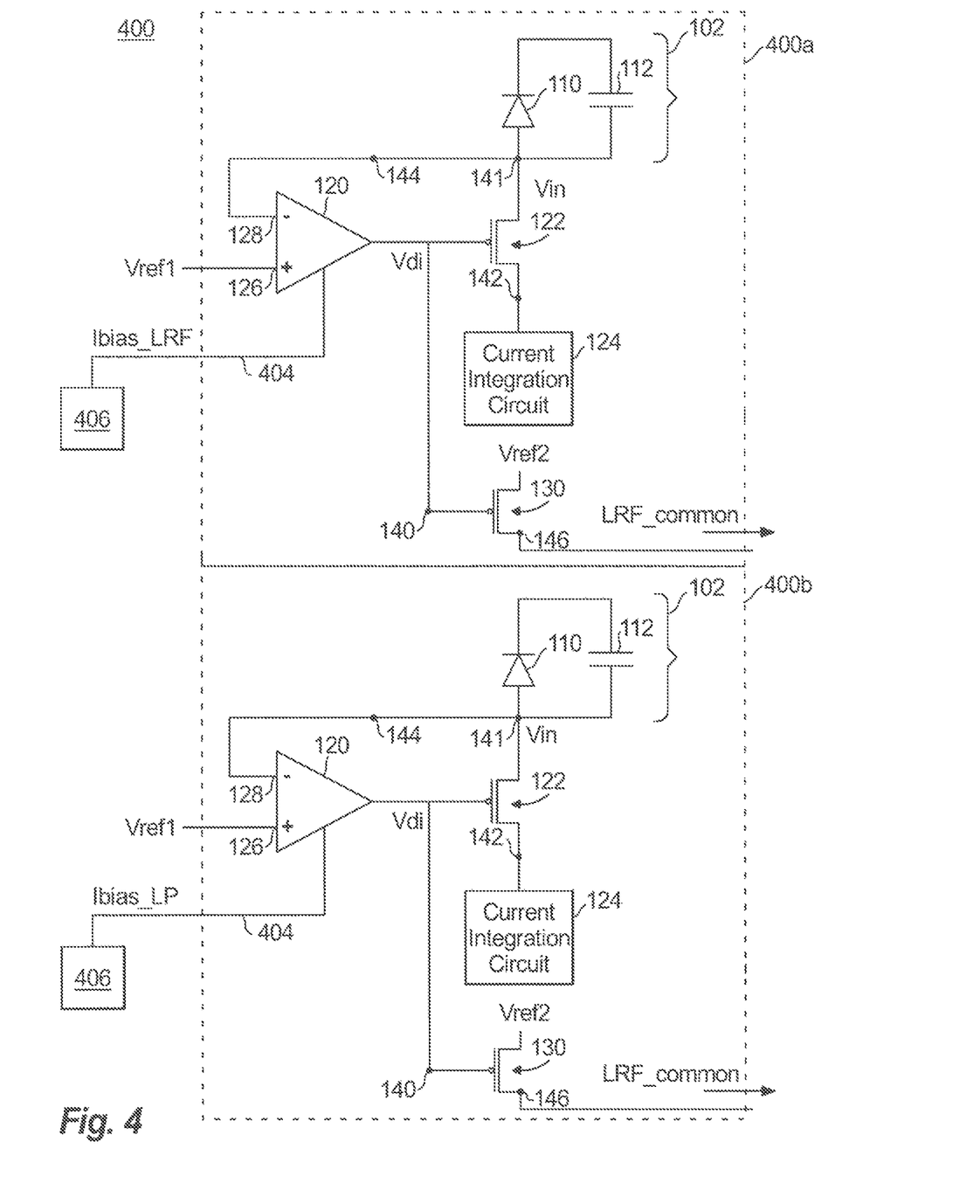
FIG. 4 shows a schematic diagram of an example pixel array that includes two multimode LRF pixels, one pixel biased to enable LRF function and one pixel biased not to enable LRF function in accordance with embodiments of the present disclosure.

With reference to FIG. 4, a schematic diagram of an embodiment of a portion of an example array 400 of pixels is shown, including a first LRF pixel 400a and a second pixel 400b. A current bias is applied to each of the pixels 400a, 400b, as indicated by contact 402 of the pixels 400a, 400b. A bias signal is applied via a bias conductor 404 to each pixel 400a, 400b at input 204 of input buffer 120. The bias signal applied to each pixel 400a, 400b can be configured by a user, a device or a circuit, such as via a LRF-enabling control circuit 406 that controls the current level of the signal applied to the input buffer 120 of each pixel 400a, 400b. The LRF-enabling control circuit 406 selects a bias signal to apply to the input buffer 120 to enable or disable a given pixel for TOF operation. The bias signal can be, for example, Ibias_LRF or Ibias_LP. The input signal to the control circuit 406 can be received, for example, from a control circuit (e.g., FPA control circuit 510 shown in FIGS. 5 and 5B), an analog device, a logic circuit, a digital processing device coupled to pixels 400a, 400b. In embodiments, the LRF-enabling control circuit 406 can be user-operable and receive the input signal from a user interface of pixels 400a, 400b.

In the example shown, both pixels 400a and 400b include LRF circuitry. A bias signal Ibias_LRF applied to LRF pixel 400a has a voltage sufficient to bias the LRF circuitry to perform LRF operations such that LRF pixel 400a operates as a multimode pixel than can perform both LRF and imaging functions. However a bias signal Ibias_LP that has a voltage less than the voltage of bias signal Ibias_LRF (causing a lower bias current as compared to the bias current caused by Ibias_LRF to be utilized within input buffer 120) is applied to pixel 400b. The voltage of bias signal Ibias_LP is insufficient for the LRF circuitry to perform LRF operations or for performance of TOF operation, but is sufficient for the current integration circuit 124 to perform signal integration by the current integration circuit 124.

Although not shown, pixels 400a and/or 400b can include pixel detection circuitry, such as pixel detection circuit 202 shown in FIG. 2 for pulse detection. The pulse detection performed by the pixel detection circuit 202 does not require as much power as is required for performing LRF operations. The bias Ibias_LP applied to pixel 400b, although insufficient for the LRF circuitry to perform LRF operations, is sufficient for pulse detection circuit 202 to perform pulse detection operations. Accordingly, the input buffer 120 of pixel 400b can be used for only imaging or pulse detection or for both imaging and pulse detection while bias Ibias_LP is applied to the input buffer 120. Since Ibias_LP causes a lower bias current than Ibias_LRF, pixel 400b consumes less power than pixel 400a.

Figure 5:
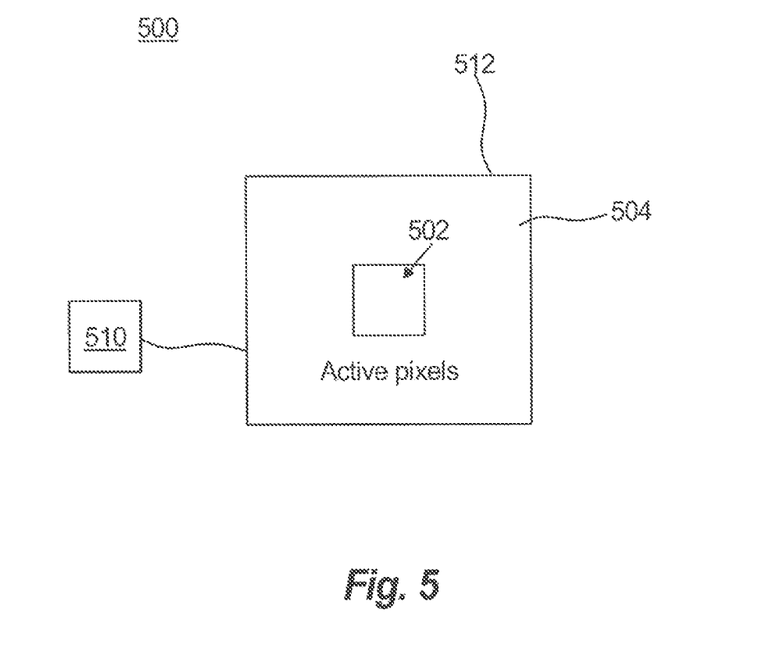
FIG. 5 shows a schematic diagram of an example focal plane array (FPA) having subarrays of pixels in accordance with embodiments of the present disclosure.

With reference to FIG. 5, a schematic diagram of an example FPA 500 is shown that has an array of pixels that includes a first subarray of LRF mode active pixels 502; a second subarray of non-LRF mode active pixels 504, wherein the second subarray includes the first subarray. An array of active pixels 512 thus includes the LRF mode and non-LRF mode active pixels 502, 504. An FPA control circuit 510 is coupled to the active pixels 504 for selecting the bias applied to the LRF mode pixels and the non-LRF mode pixels.

The LRF mode active pixels 502 are pixels that operate in LRF mode, because bias signals which are applied to their respective input buffers, such as input buffer 120 shown in FIG. 1, provide enough current for performing LRF operations. The non-LRF mode active pixels 504 do not operate in the LRF mode, because bias signals applied to their respective input buffers do not provide enough current for performing LRF operations.

Figure 5A:
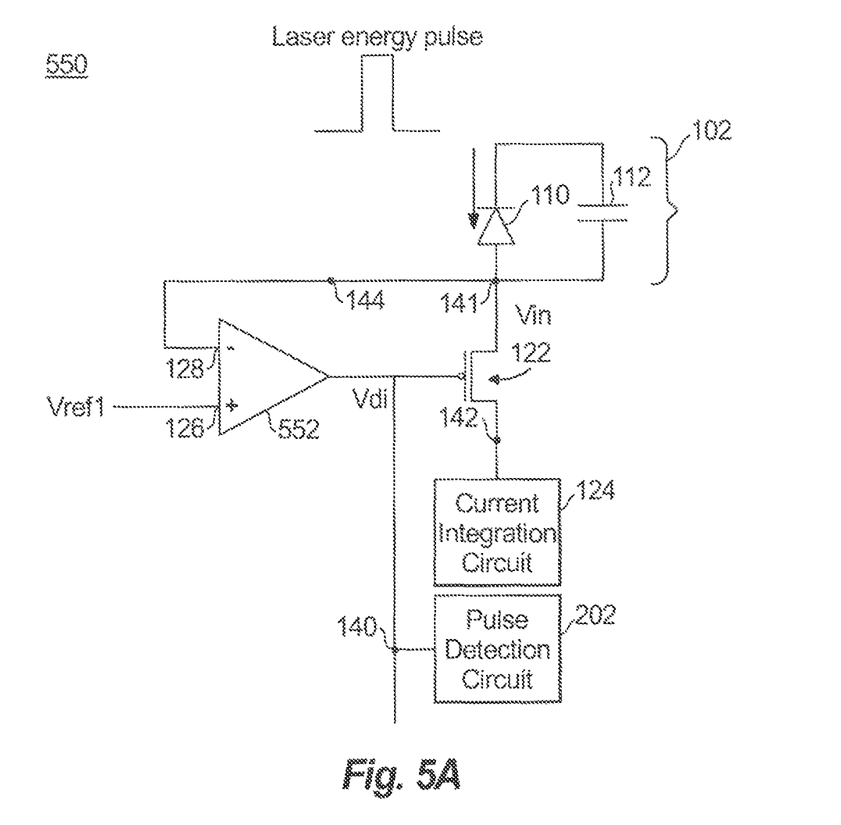
FIG. 5A shows a schematic diagram of a multimode pixel that does not have LRF capabilities in accordance with embodiments of the present disclosure.

In embodiments, the LRF mode active pixels 502 have different architectures than the non-LRF mode active pixels 504. The LRF mode active pixels 502 can have the architecture of multimode LRF pixel 100 shown in FIG. 1. FIG. 5A shows a schematic diagram of an example non-LRF mode pixel 550. Comparing non-LRF mode pixel 550 to multimode LRF pixel 100 shown in FIG. 1, which operates as an LRF mode pixel 502 when a sufficient bias signal is applied, such as Ibias_LRF. First, non-LRF mode pixel 550 does not include amplifying transistor 130 of the multimode LRF pixel 100. Second, non-LRF mode pixel 550 may have an input buffer 552 that has a reduced capacity for handling a larger bias current relative to the input buffer 120 of the multimode LRF pixel 100 (e.g., an LRF mode pixel 502). Although the capacity of the input buffer 120 for handling the larger bias current relative to the capacity of the input buffer 552 provides the advantage of the ability to amplify higher frequency signal content the input buffer 120 may consume more area and consumes more power than input buffer 552.

The non-LRF mode pixel 550 can be a multimode pixel that includes the current integration circuit 124 and the pulse detection circuit 202 with the Ibias_LP 404 applied to input buffer 120.

Due to the potential reduction in size of the input buffer of pixel 550 relative to the multimode LRF pixel 100 as well as the decreased number of components (e.g., omission of the amplifying transistor 130 and possibly omission of one of the current integration circuit 124 or the pulse detection circuit 202), the non-LRF mode pixel 550 may require a smaller area footprint, consumes less power, and dissipates less heat relative to the multimode LRF pixel 100. In embodiments, the LRF mode active pixels 502 and the non-LRF mode active pixels 504 can have the same architecture, whereas it is the bias selected to be applied to the pixels that determines whether the pixels are LRF mode active pixels 502 or non-LRF mode active pixels 504. For example, bias signal Ibias_LRF is applied to the LRF mode pixels, enabling these pixels to operate in LRF mode. The lower voltage bias signal Ibias_LP, which is insufficient for operating in LRF mode, is applied to the non-LRF mode active pixels 504, causing these pixels to operate in non-LRF mode. In addition, when operating in the non-LRF mode, power consumption and heat dissipation are decreased relative that of the LRF mode active pixels 502.

However, since the architecture is the same for both the LRF mode active pixels 502 and the non-LRF mode active pixels 504, the LRF mode active pixels 502 and the non-LRF mode active pixels 504 have the same footprint and occupy the same amount of real estate in the FPA 500. Although the footprint of the non-LRF mode active pixels 504 may not be reduced in theses embodiments, uniform pixel architecture within the array of active pixels 512 can be advantageous.

Thus, in order to conserve power consumption and minimize heat dissipation, the size of the subarray of LRF mode active pixels 502 can be minimized. In these embodiments, the bias signal applied to the different pixels of the array of active pixels 512 can be selected for configuring the size and position of the subarray of active LRF mode pixels 502 via the FPA control circuit 510.

The size and positioning of the subarray of active LRF mode pixels 502 can be determined based on several factors, such as pixel pitch, pixel sensitivity, pixel bandwidth, and laser source energy. In embodiments, based on expected reflected laser spot size and energy of an intended usage case, the subarray of active LRF mode pixels 502 can be an array of 8×8 multimode LRF pixels 100, without limitation to a particular size. Additionally, the subarray of active LRF mode pixels 502 can be disposed at the center of the array of active pixels 512, without limitation to this arrangement.

Figure 5B:
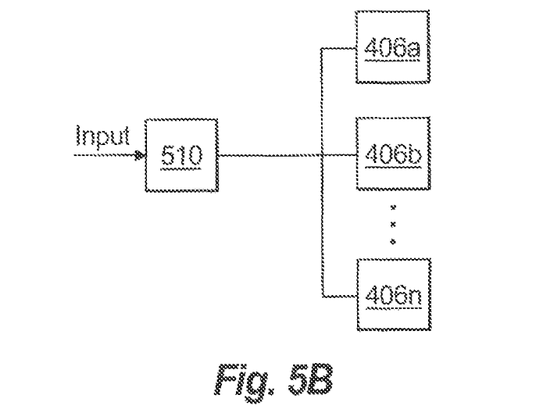
FIG. 5B shows a schematic diagram of an example control circuit for an FPA in accordance with embodiments of the present disclosure.

With reference to FIG. 5B, a schematic diagram is provided that shows an example FPA control circuit 510 receiving an input signal, for example from an analog device, a logic circuit, or a digital processing device coupled to the FPA 500. In embodiments, the FPA control circuit 510 can be user-operable and receive the input signal from a user interface of the FPA 500. The FPA control circuit 510 can provide an input to the LRF-enabling control circuit 406 that selects the bias signal to be applied to the input buffer (e.g., input buffer 120 shown in FIG. 2) of the LRF mode pixels 502 and the non-LRF mode pixels 504.

Figure 6:
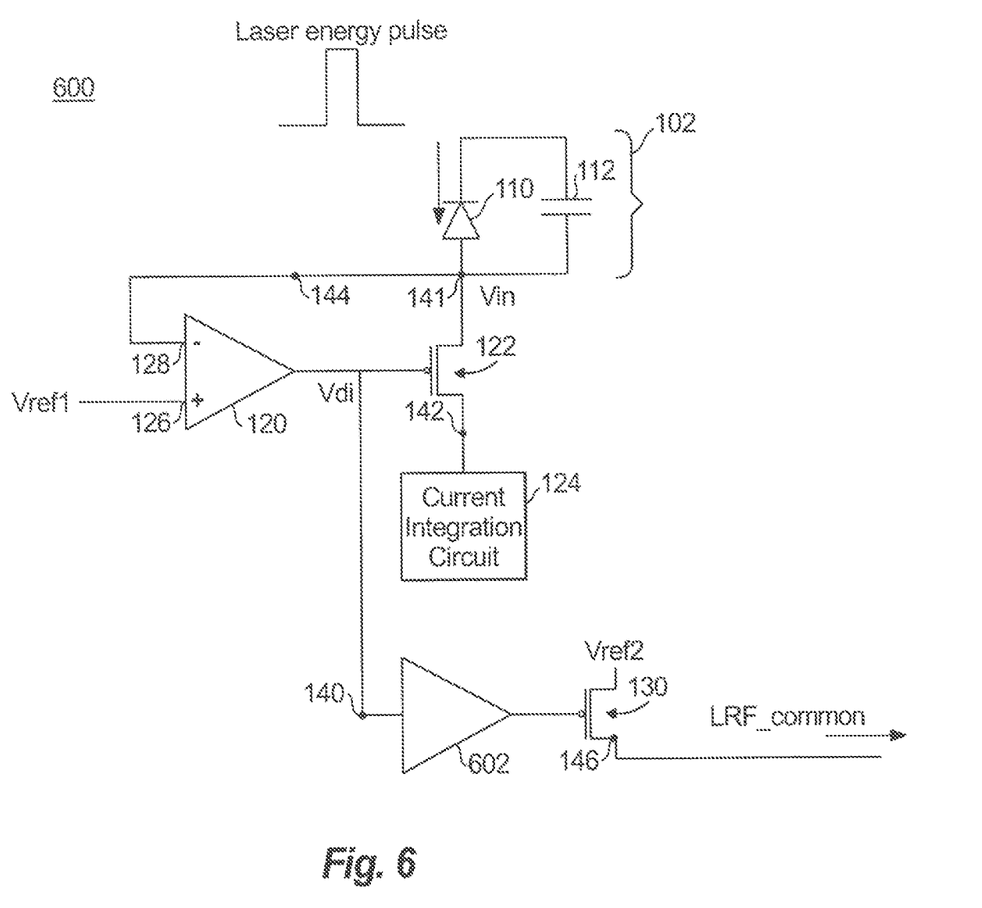
FIG. 6 is a schematic diagram of another embodiment of an example multimode LRF pixel in accordance with embodiments of the present disclosure.

With reference to FIG. 6, a schematic diagram of an embodiment of an example multimode LRF pixel 600 is shown. Description of components of multimode LRF pixel 600 that are the same as multimode LRF pixels 100, 200, and 300 shown in FIGS. 1, 2, and 3, as indicated by their reference numbers, are not repeated, other than for particular relevance to the embodiment shown in FIG. 6. Multimode LRF pixel 600 further includes an amplifier 602 coupled between node 140 and the amplifying transistor 130. Amplifier 602 provides a second amplification stage following a first amplification stage provided by the input buffer 120. The amplifier 602 can be a single-ended amplifier or a differential amplifier, and can be inverting or non-inverting.

In embodiments, multimode LRF pixel 600 can further include a detection circuit, such as the pulse detection circuit 202 shown in FIG. 2 (in addition to or instead of the integration circuit 124), and/or a high pass filter, such as the high pass filter 302 shown in FIG. 3.

Figure 7:
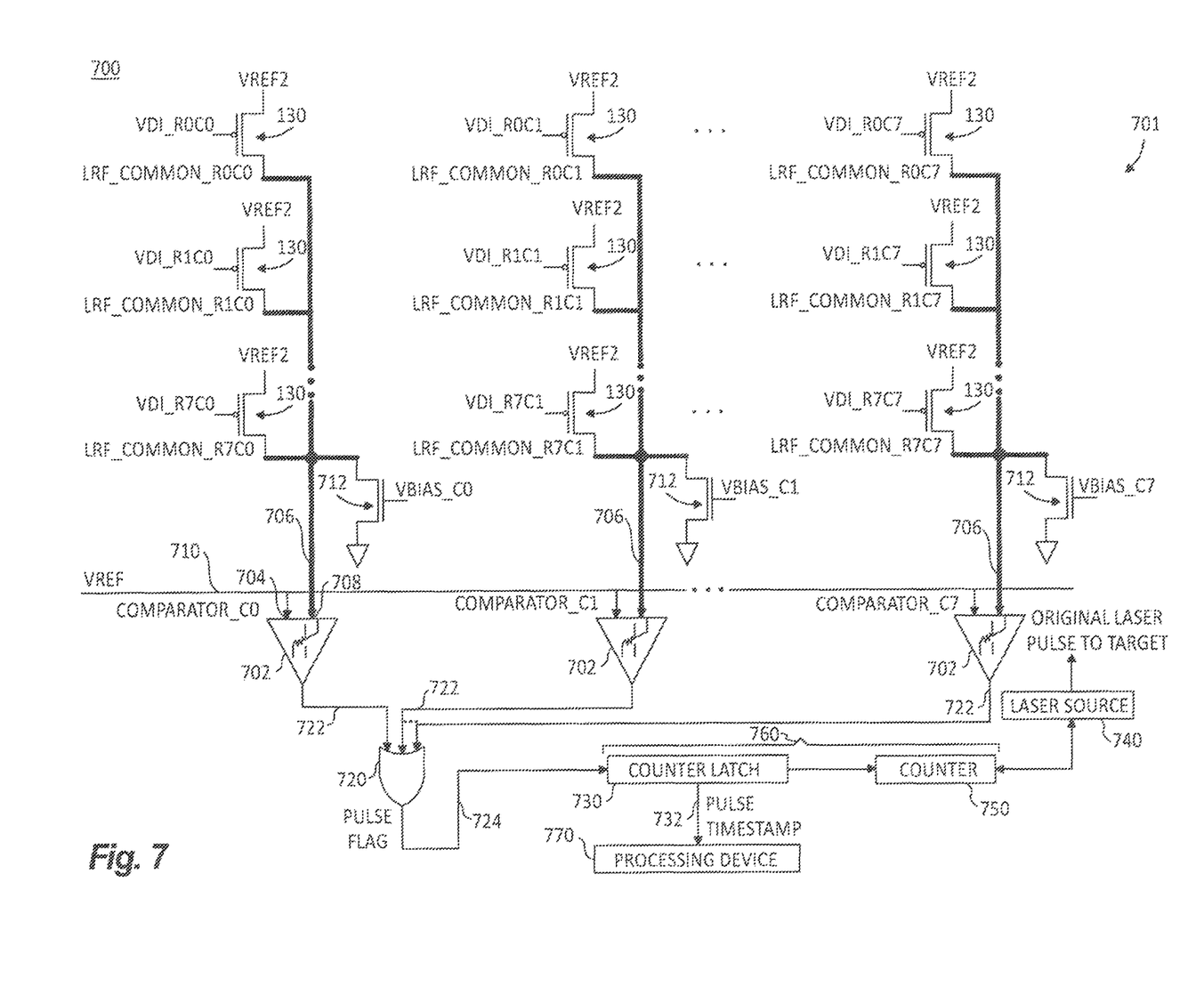
FIG. 7 is a schematic diagram of an example TOF receiver circuit of a portion of a readout integrated circuit (ROIC).

With reference to FIG. 7, a schematic diagram is shown of an example TOF receiver circuit 700 of a portion of a ROIC. The TOF receiver circuit 700 shown includes amplifying transistors 130 of an array of LRF mode active pixels (such as LRF mode active pixels 502 of the first subarray shown in FIG. 5). In the example shown, the array of the LRF mode active pixels is an 8×8 array having rows R0-R7 and columns C0-C7, however the size of the array is not limited to the example shown.

This figure depicts VDI_RiCj applied to the amplifying transistor 130 of a corresponding LRF mode active pixel of the array in row i and column j, $0 \le i$, $j \le 7$) of the array. In the example shown, LRF_common_RiCj ($0 \le i$, $j \le 7$) signals output by the LRF mode active pixels of each column of the subarray are received at a common net 706. Each common net 706 is depicted by bold lines, where the bold graphics are for illustrative purposes to show interconnects (e.g., a wires or traces) that are electrically connected and form the common net, rather than to indicate a structural difference relative to other interconnects. Each common net 706 includes the interconnects that are commonly connected between circuit elements shown.

The common net 706 of each column is also coupled to a bias/reset transistor 712. Each bias/reset transistor 712 operates to provide steady state current bias to the associated common net 706 to which it is coupled or to periodically reset the associated common net 706 in preparation for a LRF signal detection operation.

At any moment, if one or more LRF_common_Cj signals output to the common net 106 of one of the columns Cj are HIGH, the LRF_common_Cj signal transmitted along that column is HIGH, otherwise the signal is LOW. At any moment, one or more VDI_RiCj signals can experience a voltage delta in response to a photocurrent pulse in one or more of the LRF pixels. The voltage delta on one or more VDI_RiCj signals will act, through the amplifying transistor 10, to generate a voltage delta on the associated LRF_common_Cj, common net 106. The column signals LRF_common_Cj may be subsequently processed by the downstream LRF circuit to detect a time of arrive and generate a timestamp.

In the example shown, bias transistor 124 is shown, connecting to each column common net 106. The bias transistor 124 serves to provide a small bias current or load, completing an amplifier formed by the amplifying transistors 10 and the bias transistor 124. Alternatively or additionally, the bias transistor 124 may be operated in a digital manner and serve as a reset device. In this configuration, the gate of the bias transistors VBIAS_Cj, would be pulsed before the expected arrival of a pulsed laser event, resetting the common nets 106 to a known reset voltage.

A first portion of the TOF receiver circuit 700 that processes LRF_common_RiCj in an asynchronous manner includes comparators 702 and OR device 720. The comparator 702 is provided for each column 0-7. A reference signal VREF is provided via a reference line 710 to a reference terminal 704 of each of the comparators 702. The common net 706 for each column j, j=0-7, is delivered to an input terminal 708 of the comparator 702 designated for that column. The comparator 702 is external from each of the LRF mode active pixels.

The output of the each comparator 702 is connected by a respective comparator output line 722 to the OR device 720, wherein the OR device, like the comparators 702, is located outside of the LRF mode active pixels. If any or all of the comparators 702 are triggered to output a HIGH signal, the comparator 702 outputs a pulse flag signal via an OR output line 724.

The TOF receiver circuit 700 is not limited to a particular configuration. For example, a comparator can be used for each LRF mode active pixel, for more than one column of the subarray of LRF mode active pixels, for one or more rows of the subarray of LRF mode active pixels. In embodiments, the TOF receiver readout circuit 700 can include one or more sense amplifiers. An advantageous feature of the receiver readout circuit 700 is that, in embodiments, the LRF_common_RiCj signals are output directly from the corresponding amplifying transistors 130 and processed external to the LRF mode active pixels, such as by one or more comparators 702, one or more sense amplifiers, or one or more OR device 720 or equivalent circuits. In this way, the number and size of components added to the LRF mode active pixels to provide enhanced LRF mode capability is minimized. For example, the difference between a pixel that can operate in LRF mode and a pixel that cannot may be the amplifying transistor 130, and the level of the bias signal to the input buffer 120, such as via a bias conductor, such as bias conductor 404 shown in FIG. 4.

In a second portion of the TOF receiver circuit 700, the pulse flag signal output via OR output line 724 can be synchronized with the transmission of the original laser pulse output by a laser source to a target (or vice versa) in order to ascertain a time-of-flight of the laser pulse reflected from the target and a distance to the target. This synchronization can be accomplished, for example, by a laser source 740 transmitting a counter reset to a counter 750 of receiver readout circuit 700 of an FPA at a known time relative to the time that the laser source 740 emits an original laser pulse toward a target. The counter 150 will then increment and count in response to a counter clock. The laser source 740 can be co-located with the FPA or can be located at a fixed position relative to the FPA such that a known time-of-flight offset could be applied. Upon receiving the counter reset, the counter 750 begins counting. Furthermore, once a pulse flag signal is generated by the receiver readout circuit 700 (e.g., output by the OR device 720), the current counter value is latched in a counter latch 730.

The counter latch 730 can be, for example, a register or memory element that latches (i.e., stores) the counter value and can be readout to a processing device or user for additional processing. This latched counter value represents the time between transmission of the original laser pulse to a target transmission and detection of the laser pulse reflected from the target. The latched counter value can thus be used to determine a distance to the target. The counter 750 can be free-running or can be reset after every readout of the counter latch 730. In the former case, synchronization between the receiver readout circuit 700 and the laser source must be is retained, such as by latching the counter value each time the laser source outputs an original laser pulse towards a target.

The FPA mode active pixel described can thus be provided in a subarray of an FPA. In embodiments, the FPA mode active pixel can be configured uniformly with non-FPA mode active pixels, wherein whether the active pixels operate in FPA mode or non-FPA mode can be controlled by bias signals applied to their input buffers to operate in an FPA mode or a non-FPA mode. The bias signals can be controlled by a user via a user interface or a device, such as an analog device, a logic circuit, or a digital processing device coupled to the FPA. Operating only selected active pixels in the FPA mode conserves power and minimizes heat dissipation.

In embodiments, the FPA mode active pixels can be configured differently than the non-FPA mode pixels, such as to conserve real estate in the FPA. Pixels that can operate in the FPA mode are provided with a small number of components to achieve the FPA mode capability. These components include a bias conductor for biasing the input buffer, a pass transistor for passing the output of a high frequency signal that travels along a high frequency path, and an output line for outputting LRF_common signals output from the pass transistor for processing external to the FPA mode active pixel. None, some, or all of these components can be provided in the non-FPA mode active pixels. Components for processing the signals output by the FPA mode active pixels of the FPA are external to these pixels, which minimizes pixel size and pixel pitch and maximizes resolution of the FPA.

Furthermore, the processing of the LRF_common signals involves comparing the LRF_common signals to a reference signal, such that when the LRF_common signal of any of the LRF mode active pixels is sufficiently different from the reference signal, a pulse is generated. The binary or digital nature of the pulse can be processed without a tradeoff between range and resolution of the FPA or its pixels. Without this tradeoff, range limitations merely arise from signal-to-noise resolution (SNR) of the FPA, and resolution limitations merely arise from FPA bandwidth, SNR, and counter-clock jitter.

The methods and systems of the present disclosure, as described above and shown in the drawings, provide for multimode LRF pixels that provide for independent readout of image signals and pulse data. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A multimode LRF pixel of a pixel array comprising:
   a photodetector;
   an image sensing circuit having a first plurality of transistors, the image sensing circuit configured to perform passive imaging operations; and
   a laser range finding (LRF) circuit having a second plurality of transistors, at least one transistor of the second plurality of transistors, but not all of the second plurality of transistors, being included in the first plurality of transistors, the LRF being configured to perform LRF operations; wherein the image sensing circuit and the LRF circuit are configured to perform concurrently.

2. The multimode LRF pixel of claim 1, wherein the LRF circuit has a bandwidth greater than 200 MHz.

3. The multimode LRF pixel of claim 1, wherein the LRF circuit has a bandwidth greater than 500 MHz.

4. The multimode LRF pixel of claim 1, further comprising:
- a pulse detection circuit configured to perform asynchronous laser pulse detection (ALPD) operations; and
- a bias conductor, wherein:
  - when a bias signal having a first bias level is applied to the bias conductor, the multimode LRF pixel operates at a first bandwidth that enables the LRF circuit to perform LRF operations, and
  - when a bias signal having a second bias level different than the first bias level is applied to the bias conductor, the multimode LRF pixel operates at a second bandwidth that does not enable the LRF circuit to perform LRF operations but allows the laser pulse detection circuit to perform the ALPD and passive imaging operations.

5. The multimode LRF pixel of claim 1, wherein the LRF circuit is coupled to at least one comparator for comparing output of the LRF circuit and every comparator coupled to the LRF circuit is external to the multimode LRF pixel.

6. The multimode LRF pixel of claim 1, further comprising:
- a pulse detection circuit configured to perform asynchronous laser pulse detection (ALPD) operations;
- a first path connected to the image sensing circuit;
- a second path connected to the pulse detection circuit, the first and second paths being configured for readout synchronized by a frame timing signal and a pulse timing signal, respectively; and
- a third path connected to the LRF circuit, the third path being configured for asynchronous transmission.

7. The multimode LRF pixel of claim 1, LRF circuit, wherein only one transistor of the second plurality of transistors is not included in the first plurality of transistors.

8. A focal plane array (FPA) having an array of multimode laser range finding (LRF) pixels, each multimode LRF pixel comprising:
- a photodetector;
- an image sensing circuit having a first plurality of transistors, the image sensing circuit configured to perform passive imaging operations; and
- a laser range finding (LRF) circuit having a second plurality of transistors, at least one transistor of the second plurality of transistors, but not all of the second plurality of transistors, being included in the first plurality of transistors, the LRF being configured to perform LRF operations; wherein the image sensing circuit and the LRF circuit are configured to perform concurrently.

9. The FPA of claim 8, wherein the LRF circuit has a bandwidth greater than 200 MHz.

10. The FPA of claim 8, wherein the LRF circuit has a bandwidth greater than 500 MHz.

11. The FPA of claim 8, wherein each multimode LRF pixel further comprises:
- a pulse detection circuit configured to perform asynchronous laser pulse detection (ALPD) operations; and
- a bias conductor, wherein:
  - when a bias signal having a first bias level is applied to the bias conductor, the multimode LRF pixel operates at a first bandwidth that enables the LRF circuit to perform LRF operations, and
  - when a bias signal having a second bias level different than the first bias level is applied to the bias conductor, the multimode LRF pixel operates at a second bandwidth that does not enable the LRF circuit to perform LRF operations but allows the laser pulse detection circuit to perform the ALPD and passive imaging operations.

12. The FPA of claim 8, wherein the LRF circuit is coupled to at least one comparator for comparing output of the LRF circuit and every comparator coupled to the LRF circuit is external to the multimode LRF pixel.

13. The FPA of claim 8, wherein each multimode LRF pixel further comprises:
- a pulse detection circuit configured to perform asynchronous laser pulse detection (ALPD) operations;
- a first path connected to the image sensing circuit;
- a second path connected to the pulse detection circuit first and second paths being configured for readout synchronized by a frame timing signal and a pulse timing signal, respectively; and
- a third path connected to the LRF circuit, the second and third paths configured for asynchronous transmission.

14. The FPA of claim 8, further comprising an array of active pixels, the array of multimode LRF pixels being a proper subset of the array of active pixels.

15. The FPA of claim 14, wherein the pixels of the array of multimode LRF pixels perform LRF operations at at least a predetermined resolution, wherein pixels of the array of active pixels that are not included in the array of multimode LRF pixels a) either do not include the LRF circuit or include the LRF circuit but are incapable of performing LRF operations at at least the predetermined resolution and b) include at least one of an image sensing circuit configured to perform passive imaging operations and a laser pule detection circuit configured to perform ALPD operations.

16. The FPA of claim 15, wherein:
- the pixels of the array of active pixels that are not included in the array of multimode LRF pixels include the LRF circuit, and
- a bias signal is applied to each of the pixels of the array of active pixels, the bias signal having a first or second bias level, the level of the bias signal determining whether the pixel is included in the array of multimode LRF pixels, pixels of the active array receiving an applied bias signal that has the first bias level being included in the array of multimode LRF pixels, pixels of the active array receiving an applied bias signal that has the second bias level not being included in the array of multimode LRF pixels.

17. The FPA of claim 16, further comprising at least one control circuit that receives an input control signal and controls the bias level of the bias signal applied to each of the pixels of the array of active pixels.

18. The FPA of claim 17, wherein the control signal is based on user input.

19. The FPA of claim 16, wherein the pixels of the array of active pixels are structurally uniform.

20. A multimode laser range finding (LRF) apparatus comprising:
- a laser source;
- a focal plane array (FPA) having an array of multimode laser range finding (LRF) pixels, each multimode LRF pixel comprising:

a photodetector;

an image sensing circuit having a first plurality of transistors, the image sensing circuit configured to perform passive imaging operations; and a laser range finding (LRF) circuit having a second plurality of transistors, at least one transistor of the second plurality of transistors, but not all of the second plurality of transistors, being included in the first plurality of transistors, the LRF being configured to perform LRF operations, wherein the image sensing circuit and the LRF circuit are configured to perform concurrently.

21. The multimode LRF apparatus of claim 20, having an array of active pixels, the array of multimode LRF pixels being a proper subset of the array of active pixels, wherein the pixels of the array of multimode LRF pixels perform LRF operations at at least a predetermined time resolution, wherein pixels of the array of active pixels that are not included in the array of multimode LRF pixels a) include the LRF circuit but are incapable of performing LRF operations at at least the predetermined time resolution and b) include at least one of an image sensing circuit configured to perform passive imaging operations and a laser pulse detection circuit configured to perform ALPD operations, and a bias signal is applied to each of the pixels of the array of active pixels, the bias signal having a first or second bias level, the level of the bias signal determining whether the pixel is included in the array of multimode LRF pixels, pixels of the active array receiving an applied bias signal that has the first bias level being included in the array of multimode LRF pixels, pixels of the active array receiving an applied bias signal that has the second bias level not being included in the array of multimode LRF pixels.

* * * * *